Aug. 11, 1964 W. SUERKEMPER ETAL 3,144,225

ARRANGEMENT FOR EVALUATING THE PULSES IN RAILWAY AXLE-COUNTING SYSTEMS

Filed March 22, 1961 6 Sheets-Sheet 1

INVENTOR

W.Suerkemper-H.Zeeh

BY

ATTORNEY

FIG. 2, Fig. 6 (COINCIDENCE GATE K)

INVENTOR
W.Suerkemper-H.Zeeh
BY
ATTORNEY

INVENTOR
W.SUERKEMPER-H.ZEEH
BY
ATTORNEY

Aug. 11, 1964 W. SUERKEMPER ETAL 3,144,225

ARRANGEMENT FOR EVALUATING THE PULSES IN RAILWAY AXLE-COUNTING SYSTEMS

Filed March 22, 1961 6 Sheets-Sheet 4

(TRANSLATOR)

INVENTOR

W.Suerkemper-H.Zeeh

BY R. P. Morris

ATTORNEY

INVENTOR
W. SUERKEMPER-H. ZEEH
BY
ATTORNEY

INVENTOR
W.Suerkemper-H.Zeeh

BY

ATTORNEY

United States Patent Office 3,144,225
Patented Aug. 11, 1964

3,144,225

ARRANGEMENT FOR EVALUATING THE PULSES IN RAILWAY AXLE-COUNTING SYSTEMS

Wilhelm Suerkemper, Ditzingen, and Herbert Zeeh, Constance (Bodensee), Germany, assignors, by mesne assignments, to International Standard Electric Corporation, New York, N.Y., a corporation of Delaware Filed Mar. 22, 1961, Ser. No. 97,652
Claims priority, application Germany Mar. 25, 1960
8 Claims. (Cl. 246—77)

Figure 1:
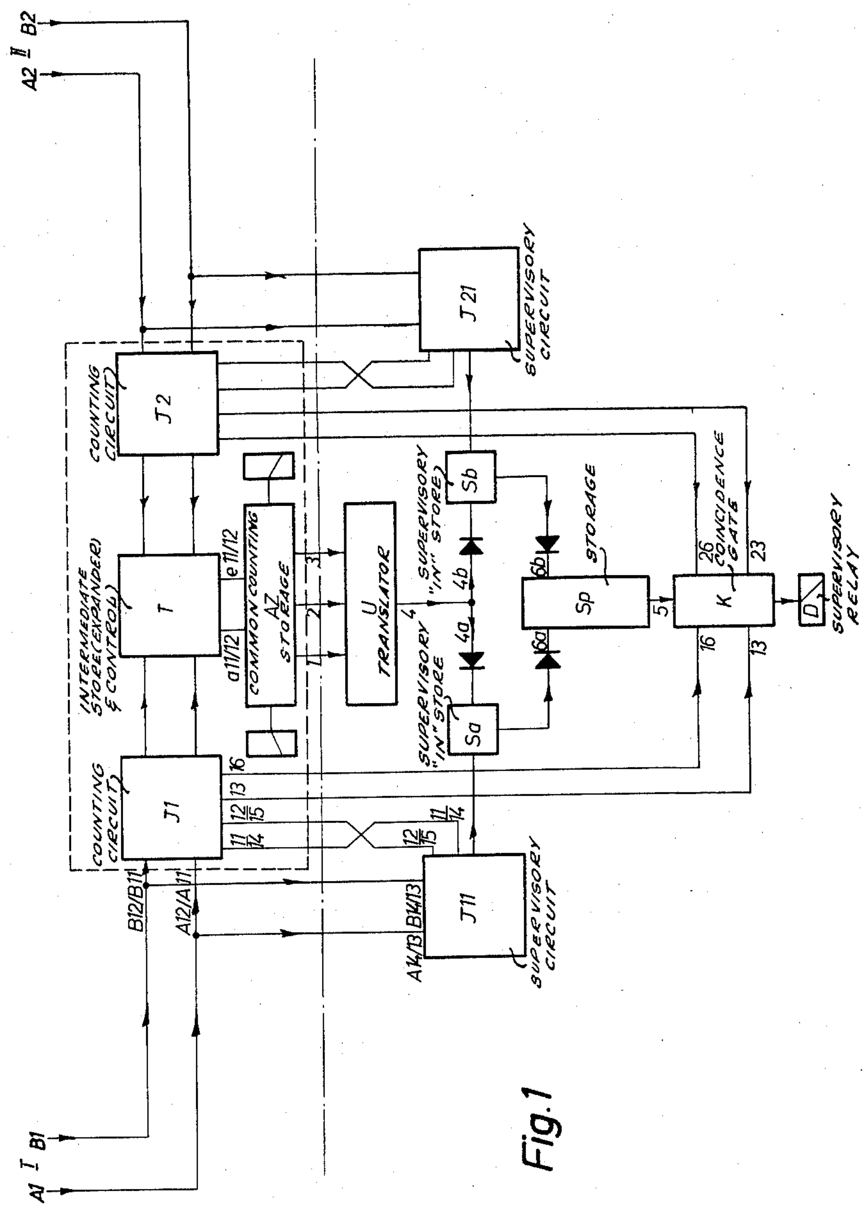

The present invention relates to a circuit arrangement for the supervision and simultaneous evaluation of information pulses supplied at axle-measuring or counting points in a railroad safety installation. These pulses are obtained at each measuring point in a partially overlapping fashion, as is the conventional procedure, and are fed to electronic switching circuits in which they are converted into direction-dependent pulses and fed to a counting storage device for effecting a counting in or out.

In conventional axle-counting systems, for the purpose of identifying the vehicle axles passing certain counting or measuring points of the track, track instruments are used which, among other things, serve to indicate the direction of train movement. The direction identification is effected in most cases in that two track instruments are provided which are staggered with respect to one another at the counting point such that a passing vehicle axle first acts upon one track instrument, thereafter upon both instruments simultaneously, and finally upon the second track instrument. Depending upon the kind of track instruments employed, the thus produced axle pulses or contact closures are transferred to the counting devices for evaluation.

In cases where the axle-counting system is used for supervising both the clear and occupancy condition of a track section, the system serves the formation of the difference between the number of vehicle axles entering and leaving a section of supervised track known as a block. This section is indicated as being occupied if a dfference from zero occurs, but is indicated as being unoccupied or cleared if there is applied to the comparing counting device exactly the same number of "out-counting pulses" as "in-counting pulses".

Since it is possible that the in-counting pulses may be prevented from becoming effective because of some malfunction in the comparing-counting device, while the out-counting pulses are being applied properly, it may happen (especially when the number of axles of a train that have not passed the supervised track section corresponds to the number of in-counting pulses which went astray) that an occupied track section is erroneously indicated as being cleared, and that a following train unit is permitted to enter this particular track section. For this reason, particularly exacting demands are placed upon the operating reliability of the axle-counting system. In particular, it must be ensured that, in doubtful cases, the supervised track section is indicated as being occupied.

It is proposed by one conventional type of circuit arrangement to supervise the operation of the counting mechanism in such a way that, upon each passing of the counting points by one or more vehicle axles, in the case of a previously cleared as well as an occupied track, a steady-current supervisory relay operates. A counting-test relay effects a trouble indication if one of these relays fails to operate.

In another conventional circuit arrangement for railway axle-counting, in which several pulse transmitters act upon a counting device, storage devices for storing the counting pulses are interconnected between the pulse transmitter and the counting device. In this way, in the case of a simultaneous monitoring of several counting or measuring points, it is possible to ascertain the correct position of the vehicle axles.

In another conventional type of circuit for an axle-counting system which effects the conversion of trains of pulses which are dependent upon the direction of movement of the vehicle axles, into counting pulses, gating circuits characteristic of electronic switching techniques are used for evaluating the axle pulses. In these circuits, a connecton extends from each input terminal of the pulse circuit to one input of input gates assigned to one of these input terminals, with these input gates only permitting the passage of a pulse applied to one of these input terminals if no effect is caused by the input gate of the other input terminal.

Another conventional type of circuit arrangement comprises, in circuit, a pair of oscillatory monitor circuits mounted to the rails, an axle-counting register, and a monostable switching circuit serving as an evaluator which, under predetermined conditions of the axle-counting register, is in the unstable condition. The monitors (counting-pulse transmitters) are connected to oscillation generators in permanently oscillating control oscillatory circuits, for respectively controlling one control-pulse generator which, in turn, is connected to the axle-counting register.

The present invention, however, is based upon an arrangement with the aid of which high operational safety requirements can be met in a simple way. In accordance with the invention, the trains of axle pulses on one hand (with the aid of electronic threshold and gating switches arranged within a supervisory circuit) are converted into direction-dependent supervisory pulses which are applied via intermediate storage devices to a supervisory device forming part of a supervisory circuit, and on the other hand simultaneously converted into direction-dependent counting pulses via an electronic device forming part of an electronic axle-counting circuit and fed to an axle-counting storage device. A reference pulse, dependent upon the content of the axle-counting-storage device, is produced which, either directly or indirectly, is fed to the supervisory circuit where it is compared to the supervisory pulse produced by the same axle pulses.

In an attempt to reduce any possible effect upon the operation of the entire system by a faulty operation of the axle-counters, that particular part of the axle-counting system which is decisive for achieving the normal operational requirements is designed, in accordance with a further feature of the invention, so that the axle pulses become effective as counting pulses after the respective two axle pulses of one measuring point (applied to one or more pulse shapers in dependence upon the polarity of the voltage variation of the one axle pulse which appears during the existence of the other axle pulse) have been converted into one direction-dependent counting pulse, and after this counting pulse has been expanded with respect to its duration, and fed to the counting-storage device by way of an alternating interrogation, for the purpose of effecting the in-counting or the out-counting respectively.

However, if a counting pulse should happen to be inadvertently prevented from becoming effective in the counting-storage device so that the traffic within the track section to be supervised would be endangered, then, in accordance with the invention, the supervisory pulse fed into the supervisory device, which is produced by the axle pulses of one measuring point, in the absence of a reference pulse appearing in dependence upon the counting pulse produced by the same axle pulses, effects a trouble indication.

On account of both the manufacturing tolerances of the functional elements and the peculiarity of the operational sequence, it is possible that a trouble indication will be released also when the axle-counting system is in perfect operating condition. In order to avoid this contingency, the invention proposes that the simultaneous response of the threshold switches in the device forming part of the supervisory circuit and of the respective device forming part of the axle-counting circuit is effected in dependence upon the same axle pulses of one measuring point, i.e. by the cross-wise dynamic coupling of the threshold switches in the supervisory circuit, that are assigned to one measuring point, to those of the counting circuit.

An advantageous type of circuit arrangement for evaluating the pulses produced at the measuring point is accomplished, in accordance with the invention, in that a counting pulse is only transferred to the counting-storage device if axle pulses are simultaneously applied to the two inputs of the counting circuit by the track instruments of one measuring point. Hence, one axle pulse, after having been converted by a pulse shaper comprising two transistors, preparatorily unblocks two electronic switching means, each of which is assigned to one direction-indicating output of a track switch. Meanwhile, the other axle pulse, after having been converted via a further pulse shaper comprising two transistors, and via a subsequently arranged differentiating circuit, serves to unblock one of the two electronic switching means of the track switch in dependence upon the polarity of the voltage variation of this axle pulse. This polarity is determined by the succession of the applied axle pulses.

The direction-dependent counting pulses as applied to the counting-storage device are fed, for the purpose of checking the proper operation of the axle-counting system, to a supervisory arrangement. Depending on the employed type of counting-storage device, it will be necessary to translate the counting pulses. According to a further embodiment of the invention, this is accomplished in that the different kinds of pulses produced by the changed position (setting) of the counting-storage device (as caused by the successive feeding-in of the direction-dependent counting pulses that become group-wise effective in the counting-storage device) are amplified by the transistors of a translator assigned to the individual groups. Further, this is accomplished in that these pulses are differentiated in transformers assigned to these transistors, and are transferred to transistors provided with a common collector resistance and arranged subsequent to the transformers. Thus, at the common output of the translator which is constituted by these transistors, uniform types of comparison pulses will appear corresponding, in a timely succession, to the counting pulses that become effective in all functional groups of the counting-storage device.

Furthermore, for the purpose of checking the proper operation of the axle-counting system, supervisory pulses are required which, in accordance with the inventive type of circuit arrangement, are only transferred to the supervisory device (forming part of the supervisory circuit) if axle pulses are applied simultaneously to both inputs of the supervisory circuit in a timely succession corresponding to the "inward-movement identification." This is accomplished in that to the electronic track switch only one switching means is assigned which is preparatorily unblocked by the action of one axle pulse, and is fully unblocked by the action of the other axle pulse having a voltage polarity of an "inward-movement identification." Since conditions with respect to time are attached to the comparison of the supervisory pulses with the corresponding reference pulses, it is appropriate that, in regard to these two threshold switches (each of which comprises two transistors) assigned to the same axle pulse, (one associated with the supervisory circuit, while the other is associated with the counting circuit), the collector electrodes of the first transistors of the two threshold switches are connected to the base electrodes of the second transistors.

Due to the employed type of circuit arrangement, the comparison pulses which are released by the same axle pulses of the measuring or counting point do not necessarily arrive at the supervisory arrangement at the same time. This is very likely to cause an untimely trouble indication. On account of this consideration and in accordance with a further feature of the invention, the intermediate storage device arranged within the supervisory circuit, and comprising two transistors, is reset by the corresponding comparison pulse produced by the same axle pulse, and only in the absence of this comparison pulse (via a timing circuit arranged subsequently to the output of the storage device, as well as via further switching means) is there effected a trouble indication with respect to the axle-counting system.

After the trouble has been indicated, it is still likely that, in the course of further operational sequences, the indication will be cancelled without its having been noticed. According to the invention, this is avoided in that the trouble indication, caused by the absence of a comparison pulse, is stored in one part of the above-mentioned further switching means consisting of a storage device assigned to the supervisory device and of two transistors, and is only capable of being erased by the action of a manual reset pulse.

Furthermore, it is of advantage to carry out the supervision of the axle-counting system not only during the operation itself but, in order to recognize any trouble in the system as well in advance as possible, to effect the trouble indication in dependence upon further criteria. According to the invention, this is accomplished in that, for the purpose of checking the function of the axle-counting system, there is used a logic circuit or coincidence gate (e.g. an AND-pulse gate) consisting of series-connected transistors, for effecting a trouble indication if the signal supervising both the functioning and the correct operation of the axle-counting system fails to appear at one of the inputs of the transistors.

The operation of the system can be endangered if more vehicle axles enter a track section to be supervised, than pulses can actually be received by the counting storage device, or else if, in the case of trouble, more vehicle axles are counted out than have been counted in. With respect to this case, it is proposed by the present invention that the comparison pulse which is caused by the changed position of the counting-storage device is prevented from becoming effective when exceeding the load capacity of the counting-storage device.

Figure 2:
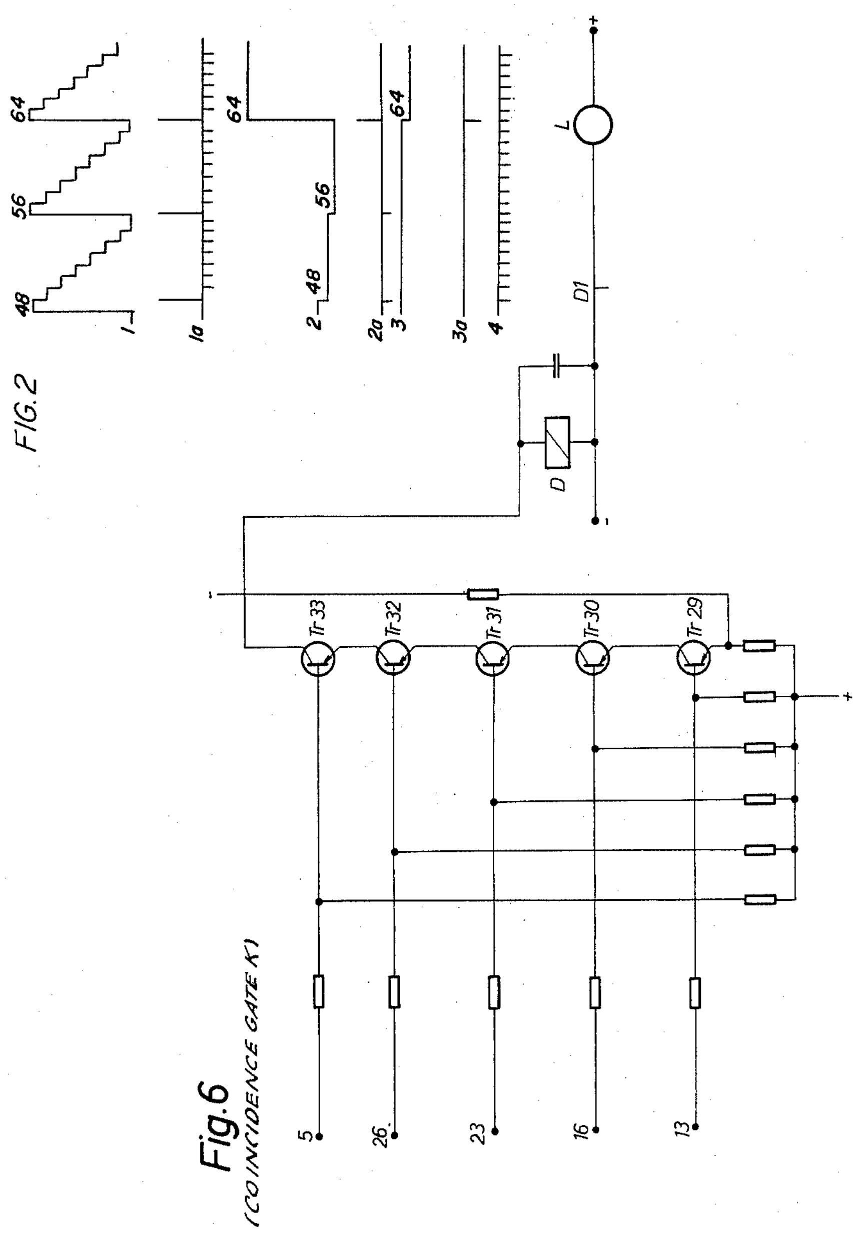

The above-mentioned and other features and objects of this invention and the manner of attaining them will become more apparent, and the invention itself will best be understood by reference to the following description of an embodiment of the invention taken in conjunction with the accompanying drawings wherein:

FIG. 1 illustrates by block diagram the inventive supervising-evaluating arrangement, FIG. 2 shows an example of the step-shaped potential curve of the counting-storage device and the corresponding translated counting pulses.

Figure 3:
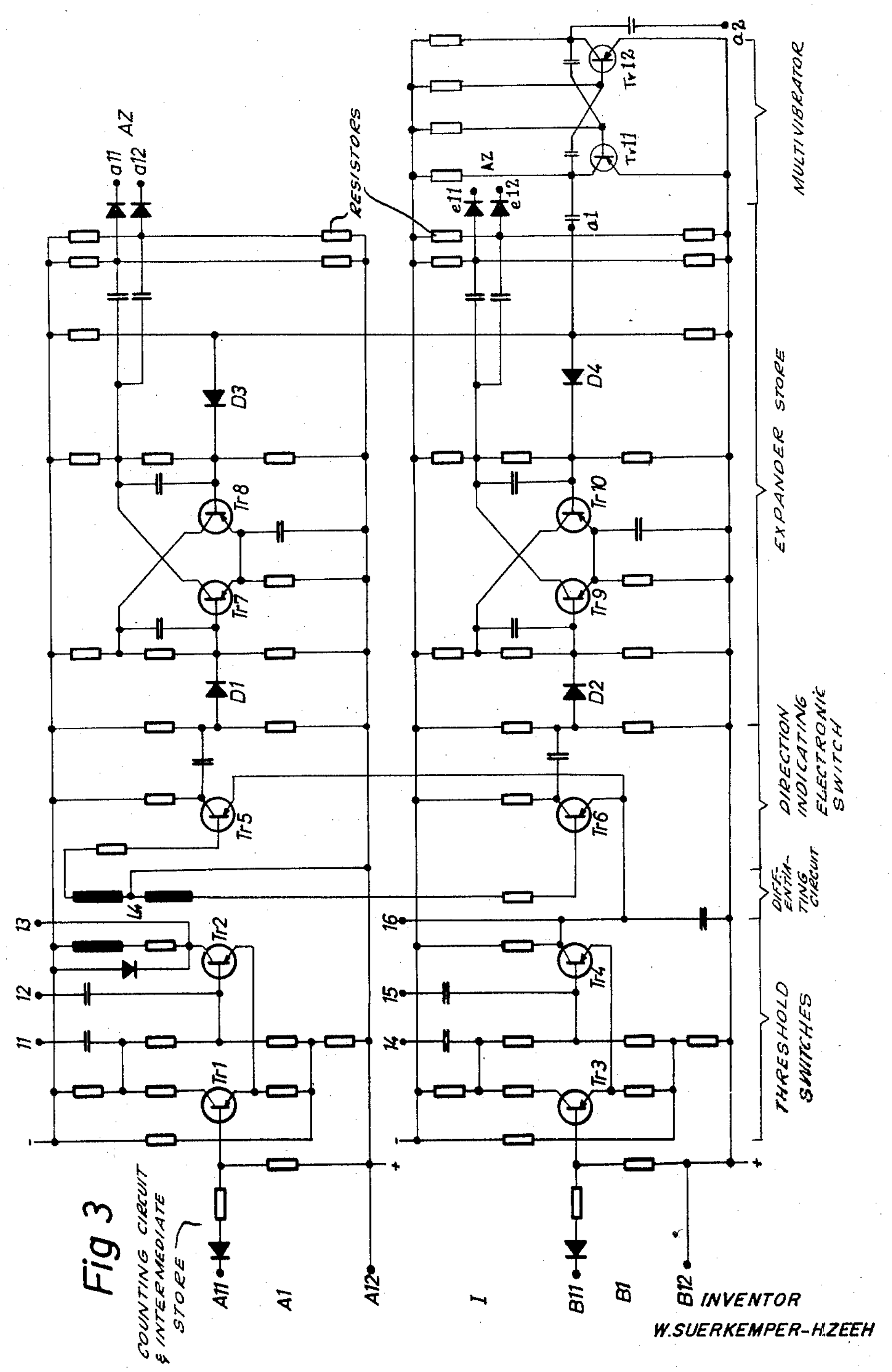
Figure 4:
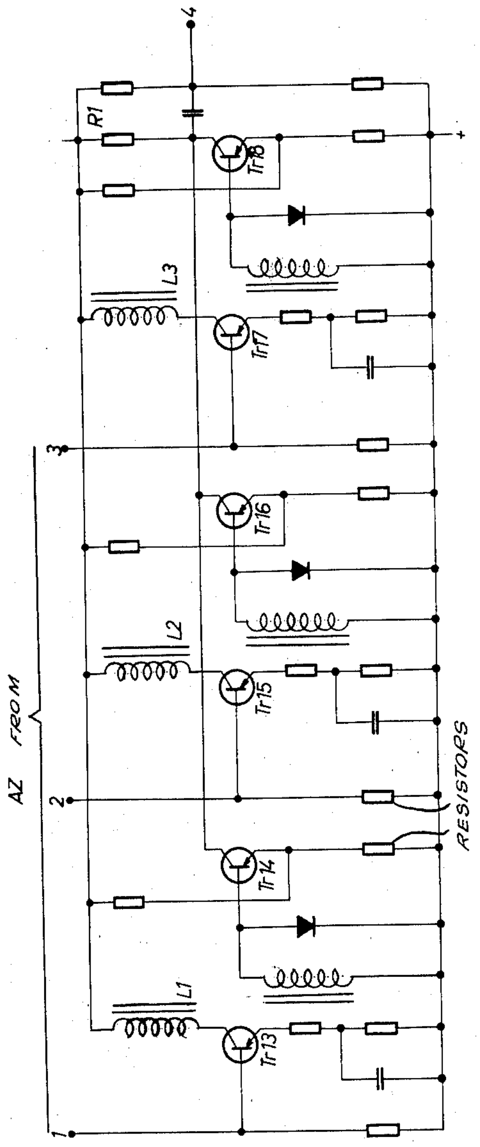
Figure 5:
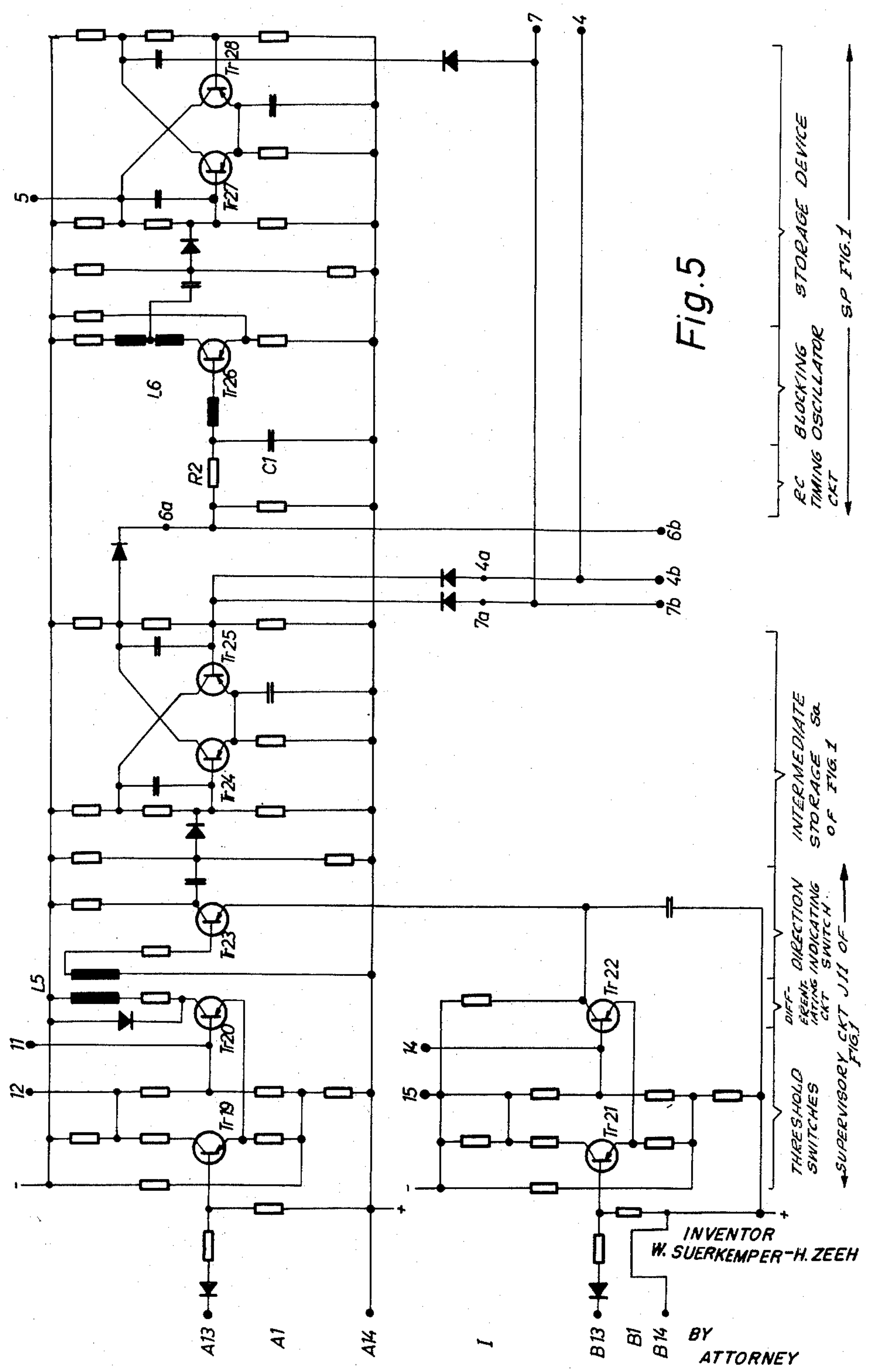
Figures 7A, 7B, 7C, 7D:
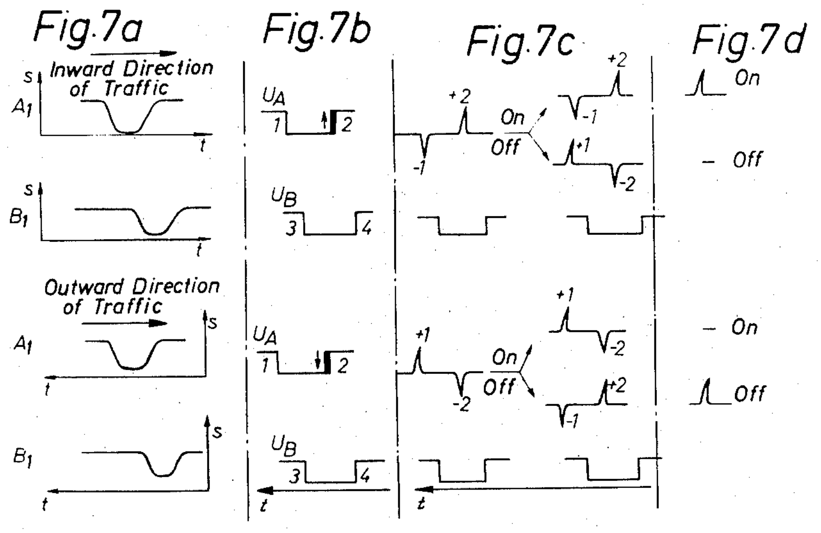

FIG. 3 shows the circuitry for the counting circuits J1 and J2 and the intermediate store and control T of FIG. 1, FIG. 4 illustrates the circuitry for the counting-pulse translator U in FIG. 1, FIG. 5 shows the supervisory circuitry including J11, *Sa*, and SP of FIG. 1, FIG. 6 shows the coincidence-gate circuit K of FIG. 1 together with a trouble-indicating circuit, FIG. 7*a* shows the pulse shape at one axle-measuring point at the inputs to the pulse shapers, FIG. 7*b* shows the pulse criteria after having been converted into rectangular pulses, FIG. 7*c* shows the shape of the pulses during the evaluation of the criteria effected by the differentiating circuit (criterion A), and in the direction-indicating electronic track switch, and FIG. 7*d* shows the counting pulses appearing at the outputs of the electronic track switches.

Referring now to FIG. 1, there is shown a block diagram for supervising and evaluating axle impulse criteria received from electronic track instruments arranged conventionally at measuring points along a track section. In this particular case, the axle-counting system serves to establish the difference between the number of vehicle axles entering and leaving a section of railway line known as a block. The section is indicated as being occupied if the difference varies from zero. The two measuring or counting points of the section to be supervised are indicated by the references I and II. The associated track instruments, as well as the associated axle pulses, are correspondingly denoted by the references A1, B1 and A2, B2 respectively. The track instruments of one measuring point are staggered locally with respect to one another and transmit corresponding axle pulses, from which it is possible to ascertain the direction of the passing vehicle axles. If a vehicle axle passes through the radius of influence of the track instruments, then the axle pulses produced by the two rail contacts will overlap. The axle pulses are fed separately to, respectively, the inputs B11/B12 or A11/A12 of the counting-circuit device J1 and, simultaneously, to the inputs A14/A13 or B14/B13 of the supervisory circuit device J11. In a corresponding manner, the axle pulses A2, B2 produced by the track instruments of the other measuring point II are fed to similar arrangements J2 and J21. (The right and left sides of FIG. 1 are functional mirror images and thus the discussion concentrates on one side). From the inputs A11 or B11, the axle pulses are passed through both the threshold switches and the electronic switch in the counting circuit J1, and are transferred in accordance with the direction of movement of the interacting vehicle axle, to the expander stages (in T) serving the counting-in or counting-out. In accordance with the interrogating frequency of a control device, the expander stages assigned to the individual measuring points are interrogated one at a time in turn, and in case a counting pulse is present in one of the expander stages, this pulse is fed to the common counting-storage device AZ, as will be explained in detail hereinafter. Both the expander stages and the control device are represented in FIG. 1 by the block labelled "T."

The same axle pulses which serve to produce the counting pulse within the counting-storage device AZ, are simultaneously applied to the supervisory circuit device J11 or J21. If these axle pulses, with respect to their order of succession, contain the information of the "inward movement identification," then a supervisory pulse "In" is stored in the subsequently following device S*a* or S*b* of the supervisory circuit (to be described in detail hereinafter). S*a* is connected by a second input through the line 4*a* and 4 via the translator U, to the counting-storage device AZ. This counting-storage device AZ delivers a comparison or reference pulse for each "In"-pulse that has been counted-in, and which, in the corresponding supervisory device, e.g. S*a*, erases the stored supervisory pulse. The absence of the comparison or reference pulse is utilized as a criterion for indicating the disturbed operation of the axle-counting circuit during the in-counting process. This supervision is regarded as being sufficient, because the supervised section will remain blocked anyway in the case of a faulty out-counting, since the counting-storage device displays an indication differing from zero (as has already been described).

If the supervisory device S*a* or S*b* is not reset by a comparison or reference pulse (translated counting pulse of the counting-storage device AZ via line 4) within a predetermined period of time, then this device will act upon the circuit of the supervisory relay D via the storage arrangement S*p* and the logic circuit or coincidence gate K. At the same time, the coincidence gate via the lines 13, 16, 23, 26 tests whether, in the case of non-trailed measuring points, certain voltage potentials exist at corresponding points of the axle-counting system, for consequently indicating that the system is in the ready-to-operate condition.

The inventive system utilizes a counting-storage device which operates on the conventional binary notation principle. This conventional counting-storage devices AZ, of FIG. 1, which is not depicted in detail, comprises e.g. a total of 9 stages. Accordingly, it has a counting capacity of $2^9=512$ numerical values (including zero). For the purpose of effecting the translation, the counting is subdivided into three stages of three groups each. Each group comprises a resistor combination consisting of three resistors for the purpose of converting the various combination of possibilities of the three flip-flop stages into a step-shaped potential curve corresponding to the numerical values.

FIG. 2 shows part of the three potential curves 1, 2, 3 with respect to the occupation of the storage device by information relating to 47 to 70 vehicle axles to be counted-in. The individual steps of the curve extend downward as the numerical values increase. Each of the three groups has a counting capacity of eight numerical values (including zero). If the counting capacity of one group is exhausted, all of the flip-flop stages (of the first group) jump back to the zero position and effect the storing into the first stage of the second group. Thereupon the first group again passes through the step-shaped potential curve, and so on.

In the translator U, FIG. 1, the step-shaped potential curves applied via the lines 1, 2, 3 are amplified and differentiated. All of the differentiated pulses of the three groups 1*a*, 2*a*, 3*a*, FIG. 2, are applied in their timely order of succession 4, FIG. 2, to an output 4 of the translator (comparison or reference pulses).

The first group 1, FIG. 2, passes in its potential curves e.g. through the numbers ranging from 48 to 55, and produces seven negative differentiated pulses. The eighth differentiated pulse is always a positive one, because here there is effected the jumping-back, e.g. from 47 to 48. In this case the missing eighth negative differentiated pulse is supplied by the second group 2, 2*a*; the same is effected at the jumping-back of the second potential curve, i.e. at the number 64. The missing 64th pulse of the second group is supplied by the third group. If more than 511 pulses are stored in the counter, then a jumping-back is effected from 512 to 0. In this case a negative differentiated pulse will not appear.

Both the method and the circuit arrangement of the blocks J1, T and J2 in FIG. 1, will now be described in detail with reference to FIG. 3. Since the threshold switches, the direction-indicating electronic track switches, and the expander stages belonging to measuring points I and II are of the same design, the representation in FIG. 3 of only one of the two arrangements is regarded as sufficient to enable an understanding of the invention.

For example, the timely staggered and overlapped axle pulses A1 and B1, which are produced by the electronic track instruments at the measuring points I upon the passage of a wheel, are fed to the inputs A11, A12 or B11, B12 respectively (FIG. 3) of the corresponding threshold switch.

The axle pulse B1 (FIG. 7*a*) transmitted by the track instrument is converted in the threshold switch with the aid of the transistors T*r*3, T*r*4 (FIG. 3) into an almost rectangular pulse (FIG. 7*b*) and is fed to the direction-indicating electronic switch circuit for preparatorily unblocking the electronic switching means, such as the transistors T*r*5, T*r*6. In the same way, the axle pulse (FIG. 7*a*) of the track instrument A1, as applied to the inputs A11, A12 (FIG. 3), is converted into a rectangular pulse (FIG. 7*b*) via the transistors T*r*1, T*r*2. This pulse is differentiated in the subsequently arranged differentiating circuit L4, and is fed to the transistors T*r*5, T*r*6 (FIG. 3) of the electronic track switch, with either the same or an inverted polarity (depending on whether the edge (2 in FIG. 7*b*) of the applied pulse has a decreasing or increasing voltage), in the form of a negative or positive pulse of the same amplitude and duration (FIG. 7*c*).

FIGS. 7*a* through 7*d* show the voltages and criteria for the in-counting and the out-counting process of the circuit of FIG. 3. In the top halves of FIGS. 7*a* to 7*d*, the pulse curves corresponding to an "entering" vehicle axle, are shown, and in the bottom part, the corresponding curves of a "leaving" vehicle axle are shown. FIG. 7*a* shows the two overlapping axle pulses applied, by a measuring point, to the inputs A11, A12 or B11 and B12 respectively, of the threshold switches shown in FIG. 3. Subsequently to their conversion into rectangular pulses, FIG. 7*b*, the axle pulses are fed with their edges 1 and 2 or 3 and 4 respectively to the transistors T*r*5 and T*r*6, FIG. 3, of the direction-indicating track switch. The rectangular pulse A, in accordance with the edge 1, is marked by a negative pulse −1, and the edge 2 is marked by a positive pulse +2 (left-hand part of FIG. 7*c*). In accordance with the arrangement of FIG. 3, they are fed with the same polarity −1, +2, to the base-electrode input of transistor T*r*5, or else with an inverted polarity +1, −2, to the input of transistor T*r*6. The non-differentiated rectangular pulse B is applied in common to the emitter electrodes of these transistors. As previously described, a counting pulse can only appear at the collector electrode of the transistor T*r*5 or T*r*6, to which the marking pulse B1 and a positive pulse of the axle pulse A1 are applied simultaneously. This requirement is met with respect to the transistor T*r*5, FIG. 3, and, consequently a counting pulse "In" will appear at the collector electrode of this transistor (FIG. 7*d*). In a corresponding way, a counting pulse "Out" is transmitted at the collector electrode of transistor T*r*6 (as is shown in the bottom part of FIG. 7*d*) because in this case, to the base electrode of the transistor T*r*6, a positive pulse +2 is applied to the emitter electrode of transistor T*r*6 together with the criterion or axle pulse B1.

FIG. 7*b* shows that, for the transmission of a counting pulse, the axle pulse B1 and the edge 2 of the axle pulse A1 must exist, and that the direction-identification of the counting pulse depends solely on whether the edge 2 has a positive voltage variation (top part of FIG. 7*b*, inward-movement identification), or a negative variation (bottom part of FIG. 7*b*, outward-movement identification).

There are two possibilities with respect to the case where a wheel changes direction within the radius of influence of a measuring point. In one case, the vehicle axle reverses its direction of movement before the requirements necessary for the transmission of a counting pulse have been met, in other words, where only one axle pulse A1 or B1 has been transmitted to the evaluator, which presents no problem. In the other case, a counting pulse "In" has already been transmitted to the counting device by the action of the vehicle axle; in this case, upon reversal of this axle, a counting pulse "Out," acting in opposition to the first one, is transferred to the storage device, and the effect is compensatory.

To briefly reiterate the above, the timely succession of the axle pulses A and B is determined by the direction of movement of the wheel and, accordingly, together with the axle pulse B1, a pulse corresponding to the polarity of the voltage variation caused by the axle pulse A1 is applied to the transistors T*r*5 and T*r*6 of FIG. 3. The circuit of the electronic switch is arranged in such a manner that, when a train of axle pulses representing "inward-movement identification," the transistor T*r*6; and "outward-movement identification," the transistor T*r*5; applies a corresponding counting pulse "Out" or "In" via the diodes D2 or D1 respectively to the corresponding inputs of the expander stages.

By the inventive use of a non-linear feedback amplifier (Schmitt-trigger) for effecting the pulse shaping, it is possible to adjust the threshold switches in a simple way, within certain limits and in accordance with the operational requirements, with the aid of a voltage divider. In addition, this arrangement has the advantage that variations of the current source remain ineffective, because the threshold-value point of the pulse shaper, as well as the potential of the axle identification applied to the inputs, are varied in proportion to the operating voltage.

A counting pulse applied to the input of the corresponding expander stage, which is designed as a flip-flop storage, via diodes D1 or D2, will occupy this stage so that the transistors T*r*7 and T*r*8 or T*r*9 and T*r*10 respectively will change their state. On account of this and at the outputs *e*11, *e*12 or *a*11, *a*12 respectively, which serve to connect the expander stage to the counting-storage device AZ, there will be obtained a pulse not leading to a counting operation. The expander stage is only restored to its original circuit condition after an effective interrogating pulse has been applied via the input *a*1 and the diodes D3 and D4 to the transistors T*r*8 and T*r*10, and when a corresponding, direction-dependent counting pulse is applied via the outlets *e*11, *e*12 or *a*11, *a*12 respectively, to the counting-storage device. The interrogating pulses are produced with the aid of a conventional type of multivibrator arrangement which is represented in FIG. 3 by the transistors T*r*11 and T*r*12, and are alternatingly applied via the outputs *a*1 and *a*2 to the corresponding stages of the expander connected to J1 and J2.

In order to supervise the proper storing operation, the step-shaped potential curves appearing at the outputs 1, 2, 3 of the counting storage device are applied to the inputs 1, 2, 3 of the translator (shown in FIG. 4) for producing the comparison pulses. The incoming group potentials of the counting-storage device, as applied to the corresponding inputs 1, 2, 3 of the translator, are amplified by the transistors T*r*13, T*r*15, T*r*17, and are then applied via the transformers L1, L2, L3 in an already differentiated fashion, to the base electrodes of the transistors T*r*14, T*r*16, T*r*18. The positive pulses are suppressed by the diodes which are connected in parallel with the secondary windings of the transformers. The amplitudes of the negative pulses are so high as to be limited by the transistors. In this way, minor inequalities in the step-shaped potential curves are not critical, and pulses of the same amplitude will appear in the collector circuits of the transistors T*r*14, T*r*16, T*r*18. The summation of the pulses of all groups is effected by the common collector resistance R1 of the transistors T*r*14, T*r*16, T*r*18. Subsequently thereto, a differentiation is again carried out since the pulses have lost their peaks due to the limitation (clipping) effected at these transistors. These pulses appear at the output 4 and are fed in the form of comparison pulses to the supervisory device S*a*, FIG. 1, via the lines 4, **4*a*, and 4*b***.

For the purpose of producing the supervisory pulses, the axle pulses of one measuring point, e.g. A1, B1 of the measuring point I, are applied simultaneously with the inputs of the counting circuit to the inputs A13, A14 and B13, B14 of the supervisory circuit shown in FIG. 5. The axle pulses are then applied via the transistors T*r*19, T*r*20 or T*r*21, T*r*22 of the threshold switches (which function similarly to the threshold switches contained in the counting circuit) to the simplified type of direction-indicating electronic switch comprising the transistor T*r*23.

Of all the applied axle pulses, only one supervisory pulse is stored in the subsequently arranged intermediate storage of the supervisory circuit device S*a* or S*b*, FIG. 1, when these pulses contain the information "inward-movement identification." In this case, the transistor T*r*23, FIG. 5, is unblocked (when there is simultaneously impressed thereon the axle pulse B1 together with the axle pulse A1, of corresponding polarity, differentiated via the transformer L5) and applies a supervisory pulse to the subsequently arranged intermediate storage device, so that in this storage device the states of transistors Tr24 and Tr25 are caused to change. The resetting of these transistors is effected by the comparison pulse produced by the same axle pulses and applied via the input 4.

In order to make sure that the two threshold switches which are assigned to the same axle pulse respond at the same time, they are dynamically coupled to each other. This is accomplished in that the collector electrode of the transistor Tr1 of the threshold switch of the counting circuit of FIG. 3, is connected to the base electrode of transistor Tr20 in threshold switch of the supervisory circuit in FIG. 5 (via line 11); and that the collector electrode of transistor Tr19 in this threshold switch, via the line 12, is connected to the base electrode of transistor Tr12 in the threshold switch contained in the counting circuit of FIG. 3. In the same way, transistors Tr3 and Tr4 of the further threshold switch contained in the counting circuit of FIG. 3, and assigned to the other axle pulse of the same measuring point, are connected via the lines 14 and 15 to the transistors Tr21 and Tr22 of the corresponding threshold switch in the supervisory circuit of FIG. 5. If this coupling were not provided then, especially in the case of low train speeds, the threshold switch of the supervisory circuit would operate earlier than that of the counting circuit. Thus, it would be possible for the supervisory circuit to respond although the corresponding comparison pulse was not applied during the predetermined time interval.

If the storage device, for example, the one in *Sa*, which is occupied by a supervisory pulse, is not reset by the corresponding comparison pulse—line 4, 4*a*, transistor Tr25, FIG. 5—then, by the potential applied to the output 6*a* of this storage device, and after a corresponding period of time (e.g. 10 ms.—which is caused by the RC-timing circuit R2, C1) the blocking oscillator comprising the switching means Tr26 and inductance L6 is actuated. This blocking oscillator, in turn, occupies the storage device S*p* of FIG. 1, so that the transistors Tr27, Tr28 of this storage device change their state. The output 5 effects an interaction upon the subsequently arranged logic circuit K (coincidence gate, AND-pulse gate) shown in FIGS. 1 and 6, as will be described hereinafter. The resetting of the supervisory storage device S*p* can only be effected manually; in this case a pulse is applied via the input 7 in FIG. 5 to the transistor Tr28. At the same time, the intermediate storage device in S*a* is reset to normal via the input 7*a*.

Since the supervisory circuits of the two measuring points are of the same design, only the supervisory circuit assigned to the measuring point I is shown in FIG. 5. The outputs 4*b*, 6*b* and 7*b*, FIG. 5 serve to connect the similar supervisory circuits of the measuring point II to the supervisory arrangement.

FIG. 6 shows the trouble-indicating circuit comprising the coincidence gate for supervising the function of the axle-counting system. The coincidence gate consists of five series-connected transistors Tr29 through Tr33. In the collector circuit of transistor Tr33 is arranged the trouble-indicating relay D which is energized in the normal condition, and is adapted to release in the event of trouble and, thus by the action of contact D1, cause the extinction of the trouble-indicating lamp L. Further contacts of the trouble-indicating relay D may be arranged in the circuits of a block instrument, and adapted to block the block section until the trouble has been rectified.

The transistor Tr29 of the coincidence gate is applied in its emitter path to a voltage divider. Accordingly, the series connection of all transistors is applied to a threshold so that, in case the input potential drops below the threshold value of the transistors, the corresponding transistor will be changed into its blocked state.

The inputs 13, 16, 23, 26 of the transistors Tr29, Tr30, Tr31, Tr32 are applied from the corresponding collector electrodes of the transistors (FIG. 3) arranged in the threshold switches of the counting circuits J1 and J2, FIG. 1, and thus serve to check the existence of the input voltage at these threshold switches. In the same way, however, it is also possible to check the threshold switches of the supervisory circuits. This input voltage, of course, is also missing if one measuring point is being acted upon by a wheel. Accordingly, an apparent trouble would be indicated which would report the block section as being occupied. However, the trailing of a measuring point (counting point) in any case releases an occupancy indication, so that the presumed trouble indication cannot be the cause of errors.

The input 5 of the transistor Tr33 (FIG. 6) of the coincidence gate is connected to the collector electrode of transistor Tr27 (FIG. 5) of the supervisory storage device S*p*. Depending upon the voltage potential applied by the storage device to the input 5, the transistor Tr33 will change its state, so that in the case of a non-seized storage device, it will become unblocked, whereas in cases where the supervisory storage device (in the absence of a comparison pulse) has been occupied or seized by an intermediate storage device, e.g. in S*a*, the transistor is prevented from becoming unblocked.

If the trouble-indicating circuit (FIG. 6) is caused to become effective, e.g. by the operation of the supervisory circuit, then, after the error or trouble has been removed, the supervisory circuit can be reset to its original condition by the actuation of a not-shown releasing key, in that the storage devices in either S*a* or S*b* respectively, as well as the storage device S*p* are reset to normal by the application of a predetermined potential to the input 7, FIG. 5. In the same way, the counting-storage indication is cancelled.

It may happen that more axles enter the track section to be supervised than can be accommodated in the counting-storage device. Thus, for example, if the storage device has a counting capacity corresponding to 511 axles, the 512th axle would cause the counting-storage device to be reset or restored to zero (position 0), so that the supervised section would be reported as being cleared. However, since the counting-storage device, with respect to the step from 511 to zero, does not deliver a comparison pulse to the supervisory device, a trouble indication will be effected and the system will be blocked.

A further possibility of overcharging the counting-storage device may arise, for example, when out of 20 incoming vehicle axles, only 19 effect the application of counting-in pulses to the storage device, and all of the 20 vehicle axles effect the application of counting-out pulses. In this case, the counter will jump back from zero to 511, so that during the following counting-in process, the comparison pulse of the counting storage device will again be missing, and the axle-counting system will effect a trouble indication.

While we have described the principles of our invention in connection with specific apparatus, it is to be clearly understood that this description is made only by way of example and not as a limitation to the scope of our invention as set forth in the objects thereof and in the accompanying claims.

What is claimed is:

1. In a railway-axle counting system having a pair of axle-pulse producing means at each end of a track section, each pair producing two pulses which at least partially overlap in time for each passing axle, means for supervising and evaluating the pulses produced by said axle-pulse producing means and reducing the possibility of error comprising in combination:

(*a*) means, connected to each pair of axle-pulse producing means, for converting each pair of axle pulses, produced at one end of the track section, into a direction-dependent counting pulse;

(b) supervisory means, connected in parallel to each said converting means for simultaneously converting each pair of axle pulses produced at one end of the track section into a direction-dependent supervisory pulse;

(c) a common counting storage device, coupled to the first of said converting means, for storing said counting pulses in accordance with their direction;

(d) translator means connected to said common counting storage device and responsive to an information modification therein for producing a reference pulse;

(e) supervisory storage means connected to said supervisory means for storing an inward-direction supervisory pulse;

(f) means responsive to the state of said supervisory storage means and the non-production of a reference pulse for indicating a malfunction of the system; and (g) means for preventing the production of a reference pulse when said information modification exceeds the capacity of said common counting storage device.

2. A railway-axle counting system as claimed in claim 1 in which the first-mentioned converting means comprises:

(a) a pair of threshold switches, connected to each pair of axle-pulse producing means on a one-to-one basis, for shaping the pulses;

(b) means for differentiating the output of one of said switches;

(c) a direction-indicating switch, having two separate outputs, one for each of the two possible directions, connected to said differentiating means; and (d) means for preparatorily unblocking the said direction-indicating switch with the output of the other of said pair of switches whereby the combination of one shaped and one shaped-differentiated pulse produces a pulse on one of said two outputs.

3. A railway-axle counting system as claimed in claim 2, further comprising:

(a) means for storing separately the pulses appearing on each output of the direction-indicating switch; and (b) alternating interrogation means for releasing the stored pulses to said common counting storage.

4. A railway-axle counting system as claimed in claim 1 in which both the first-mentioned converting means and the supervisory converting means comprise a pair of threshold switches connected to each pair of axle-pulse producing means on a one-to-one basis for shaping the pulses, and in which the threshold switches of the first-mentioned converting means and the threshold switches of the supervisory converting means assigned to the same track-section end are dynamically coupled for insuring simultaneous response.

5. A railway-axle counting system as claimed in claim 4 in which each threshold switch comprises a pair of transistors in series, and in which, in regard to each two threshold switches connected to the same axle-pulse producing means, the collector electrode in the first transistor in series in one threshold switch is coupled to the base electrode of the second transistor in series in the other threshold switch and the collector electrode in the first transistor in series in said other threshold switch is coupled to the base electrode of the second transistor in series in the said one threshold switch.

6. A railway-axle counting system as claimed in claim 1 in which the common counting storage device is divided into a plurality of groups, and in which the translator means comprises:

(a) a plurality of amplifying transistors, one assigned to each group;

(b) a plurality of differentiating transformers, one being connected to each of said amplifying transistors;

(c) a plurality of further transistors, one being connected to each of said differentiating transformers on its secondary side;

(d) a collector resistance connected in common to all said further transistors; and (e) a common output coupled to said common collector resistance, whereby uniform reference pulses, corresponding in a timely succession to the counting pulses becoming effective in all groups of the common counting storage device will appear at said common output.

7. A railway-axle counting system as claimed in claim 1, in which said supervisory means comprises:

(a) a pair of threshold switches, connected to each pair of axle-pulse producing means on a one-to-one basis, for shaping the pulses;

(b) means for differentiating the output of one of said switches;

(c) a direction-indicating switch, having a single output connected to the supervisory storage means, connected to the said differentiating means; and (d) means for preparatorily unblocking the said direction-indicating switch with the output of the other of said pair of switches, whereby the combination of one shaped pulse and one shaped-differentiated pulse produce a pulse on said single output only when the time succession of the pulses produced by the pair of axle-pulse producing means corresponds to an inward movement.

8. A railway-axle counting system as set forth in claim 1, in which said means for indicating a malfunction comprises means for resetting the supervisory storage means with the reference pulse and a timing circuit coupled to said supervisory storage means for determining a malfunction when said supervisory storage means have not been reset for a predetermined time, said railway-axle counting system further comprising:

(a) means coupled to said timing circuit for storing the malfunction determined thereby;

(b) a coincidence "AND" gate having a plurality of inputs connected to a plurality of probable trouble spots within said system, one of said inputs being connected to said storage means coupled to the timing circuit for storing the malfunction determined thereby; and (c) a trouble-indicating relay connected to the output of said coincidence "AND" gate for providing a trouble indication when a malfunction occurs at any one of said plurality of inputs.

References Cited in the file of this patent

UNITED STATES PATENTS

| | | |
|---|---|---|
| 879,494 | Rowell | Feb. 18, 1908 |
| 1,976,369 | Platte | Oct. 9, 1934 |
| 2,182,122 | Griffiths | Dec. 5, 1939 |
| 2,589,465 | Weiner | Mar. 18, 1952 |
| 2,701,301 | Mullarkey | Feb. 1, 1955 |
| 2,950,464 | Hinton et al. | Aug. 23, 1960 |
| 3,015,725 | Hofstetter et al. | Jan. 2, 1962 |

FOREIGN PATENTS

| | | |
|---|---|---|
| 574,023 | Great Britain | Dec. 18, 1945 |
| 604,918 | Canada | Sept. 13, 1960 |
| 1,015,041 | Germany | Sept. 5, 1957 |